Figure 1:
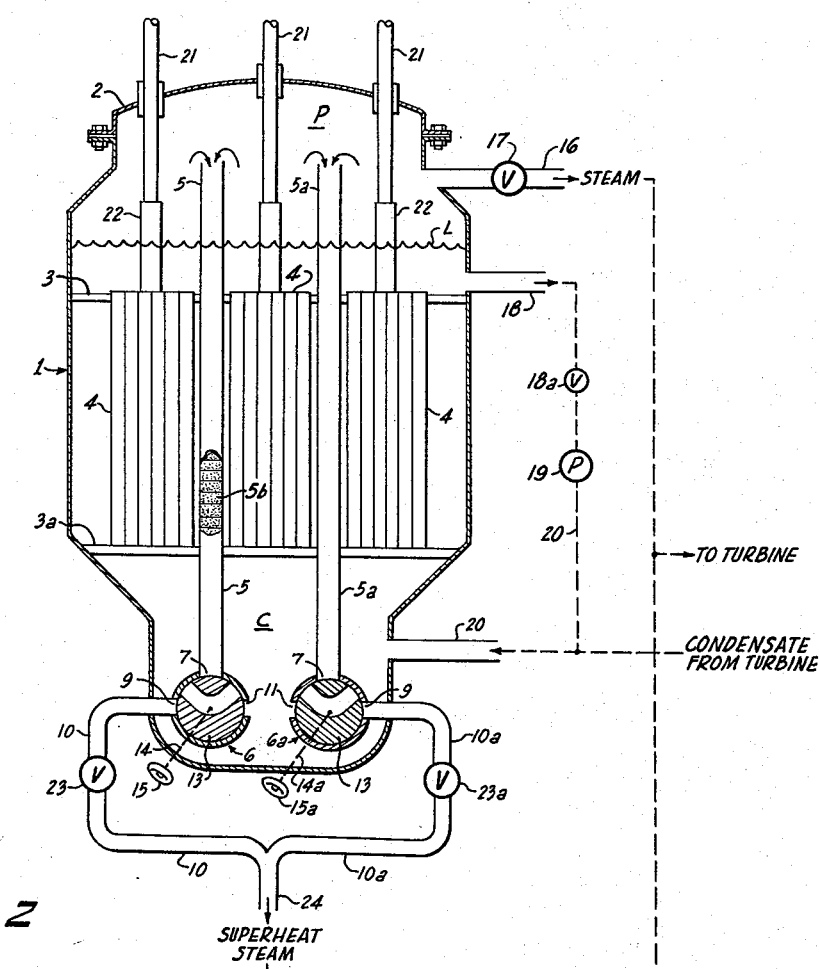

INVENTOR:
John C. Linsenmeyer

ATTORNEYS 3,132,999
NUCLEAR REACTOR
John C. Linsenmeyer, New York, N.Y., assignor to American Radiator & Standard Sanitary Corporation, New York, N.Y., a corporation of Delaware
Filed Aug. 11, 1960, Ser. No. 48,969
7 Claims. (Cl. 176—54)

This invention relates to and in general has for its object the provision of a nuclear reactor capable of selectively generating either saturated or superheated steam or any desired mixture thereof.

More specifically, the object of this invention is the provision, in a conventional boiling reactor wherein water is used as a coolant and is converted into saturated steam by passing it upward through the reactor core, of a tube or set of tubes extending through the core into the steam plenum and through which said saturated steam can be downwardly passed so as to absorb additional heat from said core and so be converted into super-heated steam.

Another object of this invention is the provision of a reactor of the character above described wherein preferably fuel elements are mounted in said tubes in addition to the usual core fuel elements.

Still another object of this invention is the provision in a reactor of the character above described, wherein the lower ends of said tubes are valved so that they can be selectively placed in communication with the lower end of the coolant chamber of the reactor or with a point external to the reactor and whereby the degree of superheat in the superheated steam can be maintained constant over a reasonable range of superheated steam production rates.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Figure 2:
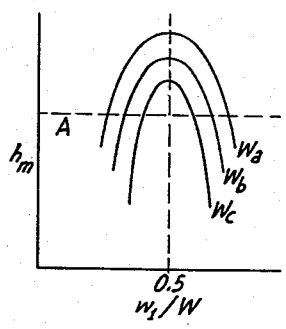

Referring to the drawings:

FIG. 1 is a schematic view in front elevation of a neutronic reactor embodying the objects of my invention; and FIG. 2 is a flow rate diagram of a two-superheat-tube system such as illustrated in FIG. 1.

Included in such reactor is a shell 1 closed at its upper end by a domed head 2.

Supported within the shell 1 are upper and lower grid plates 3 and 3a, and mounted therebetween are a number of conventional fuel-assembly shrouds 4. Disposed within the shrouds 4 are bundles of nuclear fuel in the form of spaced flat plates or rods. Water (coolant) passing up through the shrouds is partly converted to steam by the heat liberated from the nuclear chain reaction.

Passing through the grid plates 3 and 3a are a pair of superheat conduits or tubes 5 and 5a or several sets of such tubes manifolded at their lower ends. The upper ends of the tubes 5 and 5a extend well above the water level L into the steam plenum P, and their lower ends extend well below the grid plate 3 into the lower end of the coolant chamber C. Preferably fuel elements 5b may be located in the superheat tubes 5 and 5a, in spaced arrangement to permit the passage of fluid vertically therethrough. The reactor core comprises the core means identified as the shrouds 4 and its contained fuel and the additional core means identified as the superheat tubes 5 and 5a and their contained fuel.

Connected to the lower ends, respectively, of the tubes 5 and 5a are three-way valves 6 and 6a, each having a first port 7 communicating with its superheat tube 5 or 5a, a second port 9 communicating with a superheat exit line 10 or 10a, and a third port 11 communicating with a coolant water chamber C. Included in each of the valves 6 and 6a is a valve plug 13 provided respectively with valve stems 14 and 14a extending through the shell 1 and terminating respectively in hand wheels 15 and 15a for selectively rotating the valve plugs 13 to one of their two operative positions. The valve 6 as here illustrated is shown in an inoperative position. In the first operative position of each of the valves the plug 13 of each valve serves to establish communication only between the bottom of coolant chamber C and the lower ends of the superheat tubes 5 and/or 5a. In the second operative position of the valve plugs 13 each valve serves only to establish communication between the superheat tubes 5 and/or 5a and the superheat steam lines 10 and/or 10a and which respectively include regulating valves 23 and 23a.

Connected to the upper part of the shell 1 and communicating with its steam plenum P is a saturated steam line 16, including a valve 17.

Communicating with the shell 1 below the liquid level L is a coolant recirculating line 18 including a control valve 18a and a pump 19. The pump 19 in turn communicates through a line 20 with the lower end of the water coolant chamber C. This provides coolant recirculation, which is beneficial in reactor control and heat transfer.

The saturated steam line 16 conveys saturated steam to the point of use, such as a steam turbine or a heat exchanger for generating steam for space of process heat. Condensate from such turbine or heat exchanger is returned to the lower end of the coolant water chamber C through recirculating line 20.

Extending through the domed head 2 are control rod shafts 21 and attached to the lower ends thereof are conventional neutron-absorbing plates (not shown) extending into the reactor core shrouds 4. Surrounding the shafts 21 are housings 22 for protecting the neutron-absorbing plates during their movement. As is well known, the neutron-absorbing plates, when inserted further into the core, decrease the rate of neutron fissioning and hence the core power. Thus the control rod assembly is commonly used for regulating the power output of the reactor. As is well known, the water in the chamber C can serve as a moderator as well as a coolant.

If it be desired to produce only superheated steam from the reactor, one or both of the valves 6 and 6a are set so as to establish communication between the lower ends of the superheat tubes 5 and/or 5a and the superheat exit lines 10 and/or 10a, the valves 23 and 23a are opened and the valve 17 is closed. The coolant water is then made to boil as it progresses through the shrouds 4 and, as saturated steam, passes into the steam plenum P and then into the upper ends of the superheat tubes 5 and/or 5a. In passing downwardly through the tubes 5 and/or 5a, the saturated steam takes on additional heat and is converted to superheated steam, and in that form is delivered through the line 24 to the point of use.

If it is desired to simultaneously produce saturated and superheated steam and to deliver a mixture thereof to the point of use, the valves 6 and 6a are set to establish communication between the superheat tubes and the lines 10 and 10a, and the valves 17, 23 and 23a are cracked. Obviously other valve settings will accomplish the same result.

Finally, if it is desired to produce only saturated steam, the valve 17 is turned to its fully open position and the valves 6 and 6a are adjusted to establish communication between the lower ends of the tubes 5 and/or 5a and the coolant chamber C. Under these conditions coolant from the chamber C rises in the tubes 5 and/or 5a and in so doing is converted to saturated steam just as is the coolant rising through the shrouds 4.

As above indicated, the rate of nuclear reaction depends upon regulation of the control system in the reactor. This control system may consist of control rods containing neutron-absorbing material, or a variable level of moderator liquid such as described on pages 6 and 7 of Nucleonics Magazine, June 1957, or by a variable liquid reflector level such as described in Nucleonics, February 1959, starting on page 93. It is appreciated that the control system of these various types is fully known in the art. To these features, per se, applicant makes no claim of inventorship, and for this reason the details thereof have not been disclosed, but can be obtained from various readily available publications.

It should be noted that the three-way valves 6 and 6a can be located either in the coolant chamber C or external to the reactor shell 1 by suitable piping. The choice of location would depend merely upon operating convenience.

One point here should be particularly stressed. When operating as only a saturated steam generator, it is essential that coolant be made to flow through the tubes 5 and 5a, particularly if these tubes include fuel elements, for otherwise there would be serious danger of a burn-out at these points. It would not be sufficient here merely to close these tubes so as to prevent the generation therein of superheated steam.

As a result of this system the degree of superheat in the steam can be maintained at a constant value under varying steam production rates, thus eliminating excessive steam exit temperatures and desuperheating devices. Furthermore, various degrees of superheat can be achieved at various steam production rates without the necessity for desuperheating and without excessive steam exit temperatures.

Here it should be noted that this function of the reactor is made possible by the use of the independently valved superheat tubes 5 and 5a, and which can be independently operated but discharged to and mixed in the common conduit 24. If desired, one of the valves 6 or 6a can be set so as to connect the lower end of its superheat tube and the coolant chamber C, thus producing saturated steam. In that event it is only one of the tubes which operates to produce superheated steam. Here each of the tubes 5 and 5a is deemed to represent either a single tube or a plurality of manifold tubes communicating with one of the valves 6 or 6a.

The valves 6 and 6a permit the degree of superheat to be maintained constant over a reasonable range of superheated steam production rates. This is best illustrated by reference to the graphs of FIG. 2. If $W_1$ is the flow rate through one of the superheat tubes 5 and 5a and W is the total flow through both of these tubes, then $w_1/W$ is the fractional flow through the one tube. For a given total flow rate, $W_a$, the superheat of the mixture, $h_m$, can be plotted against the fractional flow, $w_1/W$, through one tube. The mixture superheat, $h_m$, becomes a maximum when the flow is equally divided ($w_1/W=\frac{1}{2}$), and it will drop off symmetrically as $w_1/W$ departs from $\frac{1}{2}$.

As shown in FIG. 2, similar curves can be plotted for increasingly higher values of total mixture flow rate, $W_b$ and $W_c$. A constant degree of supehreat is given by a horizontal line such as for example the dash line A of FIG. 2. It then can be seen that as the total flow rate is varied from $W_a$ to $W_c$, the degree of superheat of the mixture can be maintained constant by varying the distribution of flow between the two superheat tubes 5 and 5a. Thus with only two valves the degree of supehreat can be heald constant over a considerable range of superheated steam rates. Additional control over the degree of superheat may be achieved by using the neutron-absorbing rods to vary the power output of the superheat tubes.

The construction of the core design of the reactor above described has not been described in detail, for it is generally known to those skilled in the art and is covered in numerous publications such as, for example, the June 22, 1959, issue of Electrical World, beginning on page 73.

I claim:
1. In a nuclear reactor including a closed vessel partially filled with a liquid to define a steam plenum, the improvement comprising: conduit means partially immersed in the liquid for passing a medium to be heated, said conduit having one open end located in the steam plenum and another end located outside of said vessel; valve means disposed in said conduit said valve means being operable to one position to admit liquid to said conduit and to a second position to exclude liquid and provide communication from said steam plenum to the outside of said vessel and a nuclear fuel for supplying heat to the liquid in said one position of said valve to vaporize said liquid and supply steam to said steam plenum, said nuclear fuel supplying heat to said vapor in said second position of said valve to superheat the vapor.

2. In a nuclear reactor including a closed vessel partially filled with a liquid to define a steam plenum, the improvement comprising: a plurality of conduit means extending through said liquid and providing communication from the plenum to the outside of the vessel; a nuclear fuel operable to supply heat to the interior of said conduits; and valve means connected to said conduits for interrupting said communication and admitting liquid to said conduits to produce steam in said plenum through the heating of said liquid in said conduits, said valve means being selective as to the number of conduits to which liquid is admitted such that the remaining conduits continue communication from the plenum to the outside for the passage of steam which, by absorbing heat from said nuclear fuel, becomes superheated.

3. In a nuclear reactor including a closed vessel partially filled with water to define a steam plenum, and a reactor core means to heat the water to produce saturated steam in the plenum, the improvement comprising a conduit passing through the water and providing communication between the plenum and the outside of the vessel, nuclear fuel means to heat the interior of said conduit, and valve means disposed in said conduit, said valve means being operable to one position to pass saturated steam through said conduit to produce superheated steam, said valve means being operable to a second position to interrupt communication between the steam plenum and the outside and to admit water to said conduit for the production of saturated steam, whereby said conduit is selectively adapted to produce saturated steam or superheated steam.

4. A nuclear reactor comprising: a closed reactor vessel partially filled with a body of water; a reactor core means disposed within said body of water; a conduit extending through said core means with one end thereof disposed above said body of water and its other end extending through the lower end of said vessel; and a valve disposed in said conduit adjacent its lower end for selectively establishing communication between said conduit and the lower end of said vessel and between said conduit and a point external to said vessel.

5. A nuclear reactor comprising: a closed reactor vessel partially filled with a body of water; a reactor core means disposed within said body of water; a conduit extending through said core means, one end of said conduit being disposed above said body of water and its other end extending through the lower end of said vessel; nuclear fuel elements mounted in said conduit; and a valve mounted in said conduit for selectively establishing communication between the said other end of said conduit and the lower end of said vessel and between the said other end of said conduit and a point external to said vessel.

6. A nuclear reactor such as set forth in claim 4, wherein the upper end of said vessel is connected with a point external thereto through a valved outlet.

7. A nuclear reactor comprising: a closed vessel partially filled with a body of water; a conduit mounted in said vessel having one end thereof extending above said body of water and its other end extending through the lower portion of said vessel; a valve mounted in said conduit for selectively establishing communication between the lower end of said conduit and the lower end of said vessel and between the lower end of said conduit and a point external to said vessel; and a reactor core means mounted within said vessel in heat exchange relationship with said body of water and with said conduit.

References Cited in the file of this patent

UNITED STATES PATENTS

| | | |
|---|---|---|
| 2,938,845 | Treshow | May 31, 1960 |
| 2,957,815 | Pacault et al. | Oct. 25, 1960 |

FOREIGN PATENTS

| | | |
|---|---|---|
| 548,676 | Italy | Feb. 16, 1955 |
| 551,136 | Italy | Mar. 23, 1955 |
| 1,198,728 | France | June 15, 1959 |